(12) United States Patent
Lighty et al.

(10) Patent No.: US 11,365,682 B1
(45) Date of Patent: Jun. 21, 2022

(54) GAS TURBINE ENGINE COOLED SUMP BUFFER AIR SYSTEM

(71) Applicant: Rolls-Royce North American Technologies Inc., Indianapolis, IN (US)

(72) Inventors: Kerry J. Lighty, Plainfield, IN (US); Paul O'Meallie, Brownsburg, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 17/192,475

(22) Filed: Mar. 4, 2021

(51) Int. Cl.
*F02C 7/18* (2006.01)
*F02C 7/06* (2006.01)
*F02C 7/28* (2006.01)

(52) U.S. Cl.
CPC ............... *F02C 7/185* (2013.01); *F02C 7/06* (2013.01); *F02C 7/28* (2013.01); *F05D 2240/50* (2013.01); *F05D 2240/55* (2013.01); *F05D 2240/60* (2013.01); *F05D 2260/201* (2013.01); *F05D 2260/232* (2013.01); *F05D 2260/98* (2013.01)

(58) Field of Classification Search
CPC .... F02C 7/185; F02C 7/06; F02C 7/28; F05D 2240/50; F05D 2240/55; F05D 2240/60; F05D 2260/201; F05D 2260/232; F05D 2260/98

USPC .......................................................... 415/177
See application file for complete search history.

(56) References Cited

U.S. PATENT DOCUMENTS

| | | | |
|---|---|---|---|
| 6,330,790 B1 * | 12/2001 | Arora ...................... | F01D 11/04 277/303 |
| 7,836,675 B2 | 11/2010 | Corattivil et al. | |
| 8,167,534 B2 * | 5/2012 | Cornelius ................. | F02C 7/04 415/230 |
| 9,567,908 B2 | 2/2017 | Bordne et al. | |
| 10,767,560 B2 | 9/2020 | Rogers et al. | |
| 2007/0193276 A1 | 8/2007 | Corattivil et al. | |
| 2008/0107522 A1 | 5/2008 | DiBenedetto | |
| 2013/0214492 A1 | 8/2013 | Nielson et al. | |
| 2013/0283757 A1 * | 10/2013 | Bordne ..................... | F02C 7/06 60/39.08 |
| 2014/0099188 A1 * | 4/2014 | Bordne ................. | F01D 25/183 415/112 |
| 2020/0109646 A1 | 4/2020 | Black et al. | |

* cited by examiner

*Primary Examiner* — Yi-Kai Wang
(74) *Attorney, Agent, or Firm* — Barnes & Thornburg LLP

(57) ABSTRACT

A shaft assembly for a gas turbine engine includes a shaft, a bearing, and an annular sump cover. The shaft is arranged along an axis and configured to rotate about the axis. The bearing is coupled to the shaft to facilitate rotation of the shaft about the axis. The annular sump cover is fixed relative to the axis and is configured to allow a lubrication fluid and a buffer air into an air chamber formed between the shaft, the bearing, and the annular sump cover.

20 Claims, 4 Drawing Sheets

GAS TURBINE ENGINE COOLED SUMP BUFFER AIR SYSTEM

FIELD OF THE DISCLOSURE

The present disclosure relates generally to gas turbine engines and more specifically to sump and shaft assemblies adapted for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Many gas turbine engines include lubrication systems that circulate lubricants throughout the engine. These lubrication systems may clean, cool, and distribute lubricants, such as oil, to bearings and other parts of the engine. Secondary air systems may control the flow of air between chambers to prevent oil leakage and/or overheating of various parts of the engine.

SUMMARY

The present disclosure may comprise one or more of the following features and combinations thereof.

A shaft assembly for a gas turbine engine may comprise a shaft, a bearing, and an annular sump cover. The shaft may be arranged along an axis and may be configured to rotate about the axis. The bearing may be coupled to the shaft to facilitate rotation of the shaft about the axis. The annular sump cover may be fixed relative to the axis and may be configured to allow a lubrication fluid and a buffer air into an air chamber formed between the shaft, the bearing, and the annular sump cover.

In some embodiments, the shaft may include a shaft body, a knife seal, and a labyrinth seal. The shaft body may extend along the axis. The knife seal may extend radially away from the shaft body. The labyrinth seal may be spaced apart axially from the knife seal and may extend radially away from the shaft body. In some embodiments, the bearing may be spaced apart axially from the labyrinth seal to locate the knife seal axially between the bearing and the labyrinth seal.

In some embodiments, the annular sump cover may include a seal land, an outer wall, and an inner wall. The seal land may be aligned axially with the labyrinth seal to limit a flow of the buffer air passing between the seal land and the labyrinth seal into the air chamber. The outer wall may extend axially away from the seal land toward the bearing. The inner wall may extend axially away from the seal land toward the bearing.

In some embodiments, the outer wall may be formed to define a passage therethrough. The passage may allow the lubrication fluid to proceed unimpeded radially through the annular sump cover and toward the bearing.

In some embodiments, the inner wall may be formed to define a plurality of openings. The plurality of openings may be aligned axially with the knife seal so that the buffer air entering the air chamber between the seal land and the labyrinth seal is directed radially outward by the knife seal and through the plurality of openings into the lubrication fluid being allowed through the outer wall. By directing the buffer air radially outward into the lubrication fluid, heat may be transferred from the buffer air to the lubrication fluid before the buffer air impinges on the bearing.

In some embodiments, the inner wall may include a deflector hoop and a deflector wall. The deflector hoop may extend axially away from the seal land and circumferentially around the knife seal. The deflector wall may extend radially inward from the deflector hoop toward the shaft to block the lubrication fluid and the buffer air from flowing between the deflector wall and the shaft.

In some embodiments, the knife seal may have an outer radial diameter and the deflector wall may have an inner radial diameter. The outer radial diameter may be greater than the inner radial diameter to block the buffer air from flowing over the knife seal and between the deflector wall and the shaft. In some embodiments, the deflector wall may be spaced apart radially from the shaft.

In some embodiments, the outer wall may include an axial end. The axial end of the outer wall may be spaced apart axially from the bearing to define a gap therebetween.

In some embodiments, the outer wall may extend axially away from the seal land a first distance and the inner wall may extend axially away from the seal land a second distance. The first distance may be greater than the second distance.

In some embodiments, the seal assembly may further comprise a hub. The hub may be fixed relative to the axis.

In some embodiments, the hub may be shaped to define a lubrication fluid supply passageway. The lubrication fluid supply passageway may conduct the lubrication fluid through the outer wall and into the air chamber.

In some embodiments, the annular sump cover may further include a cover flange. The cover flange may extend radially outward from the seal land and engage an axial facing surface of the hub to axially locate the inner wall relative to the knife seal.

In some embodiments, the inner wall may include a deflector hoop and a deflector wall. The deflector hoop may extend axially away from the seal land and circumferentially around the knife seal. The deflector wall may extend radially inward from the deflector hoop toward the shaft to block the lubrication fluid and the buffer air from flowing between the deflector wall and the shaft.

According to another aspect of the present disclosure, a shaft assembly for a gas turbine engine may comprise a shaft, a bearing, and an annular sump cover. The shaft may be arranged along an axis and configured to rotate about the axis. The bearing may be coupled to the shaft to facilitate rotation of the shaft about the axis. The annular sump cover may be configured to allow a lubrication fluid and a buffer air into an air chamber formed between the shaft, the bearing, and the annular sump cover.

In some embodiments, the shaft may have a shaft body and a flange. The shaft body may extend along the axis. The flange may extend radially away from the shaft body.

In some embodiments, the annular sump cover may include a base portion and an inner wall. The base portion may be formed to define a passage therethrough for allowing the lubrication fluid to proceed unimpeded radially through the annular sump cover and toward the bearing. The inner wall may extend axially away from the base portion toward the bearing.

In some embodiments, the inner wall may be formed to define a plurality of openings. The plurality of openings may be aligned axially with the flange so that the buffer air entering the air chamber between the base portion and the shaft is directed radially outward by the flange and through the plurality of openings into the lubrication fluid being allowed through the base portion.

In some embodiments, the inner wall may include a deflector hoop and a deflector wall. The deflector hoop may extend axially away from the base portion and circumferentially around the flange. The deflector wall may extend radially inward from the deflector hoop toward the shaft to block the lubrication fluid and the buffer air from flowing between the deflector wall and the shaft.

In some embodiments, the flange may have an outer radial diameter and the deflector wall may have an inner radial diameter. The outer radial diameter may be greater than the inner radial diameter to block the buffer air from flowing over the flange and between the deflector wall and the shaft. In some embodiment, the deflector wall may be spaced apart radially from the shaft.

In some embodiments, the shaft may further include a seal. The seal may be spaced apart axially from the flange and extend radially away from the shaft body.

In some embodiments, the base portion of the annular sump cover may include a seal land and an outer wall. The seal land may be aligned axially with the seal to limit a flow of the buffer air passing between the seal land and the seal into the air chamber. The outer wall may extend axially away from the seal land toward the bearing. The outer wall may be formed to define the passage therethrough for allowing the lubrication fluid to proceed unimpeded radially through the annular sump cover and toward the bearing.

In some embodiments, the outer wall may include an axial end. The axial end of the outer wall may be spaced apart axially from the bearing to define a gap therebetween.

In some embodiments, the outer wall may extend axially away from the seal land a first distance and the inner wall may extend axially away from the seal land a second distance. The first distance may be greater than the second distance.

In some embodiments, the seal assembly may further comprise a hub. The hub may be fixed relative to the axis.

In some embodiments, the hub may be shaped to define a lubrication fluid supply passageway. The lubrication fluid supply passageway may allow the lubrication fluid through the outer wall and into the air chamber.

In some embodiments, the annular sump cover may further include a cover flange. The cover flange may extend radially outward from the seal land and engage an axial facing surface of the hub to axially locate the inner wall relative to the flange.

According to another aspect of the present disclosure, a method may comprise providing a shaft assembly for a gas turbine engine. The shaft assembly may comprise a shaft, a bearing, and an annular sump cover. The shaft may be arranged along an axis and may be configured to rotate about the axis. The bearing may be coupled to the shaft to facilitate rotation of the shaft about the axis. The annular sump cover may be configured to allow a lubrication fluid and a buffer air into an air chamber formed between the shaft, the bearing, and the annular sump cover.

In some embodiments, the method may further comprise conducting a flow of the lubrication fluid into the air chamber toward the bearing, conducting a flow of the buffer air between the shaft and the annular sump cover, and directing the flow of buffer air radially outward into contact with the flow of lubrication fluid as the flow of lubrication fluid enters the air chamber. The method may further comprise mixing the flow of buffer air with flow of lubrication fluid to transfer heat from the buffer air to the lubrication fluid before the buffer air impinges on the bearing.

In some embodiments, the shaft may include a shaft body, a knife seal, and a labyrinth seal. The shaft body may extend along the axis. The knife seal may extend radially away from the shaft body. The labyrinth seal may be spaced apart axially from the knife seal and extending radially away from the shaft body.

In some embodiments, the annular sump cover may include a seal land, an outer wall, and an inner wall. The seal land may be aligned axially with the labyrinth seal to limit the flow of the buffer air passing between the seal land and the labyrinth seal into the air chamber. The outer wall may extend axially away from the seal land toward the bearing. The outer wall may be formed to define a passage therethrough for allowing the flow of lubrication fluid to proceed unimpeded radially through the annular sump cover. The inner wall may extend axially away from the seal land toward the bearing.

In some embodiments, the inner wall may be formed to define a plurality of openings. The plurality of openings may be aligned axially with the knife seal so that the buffer air entering the air chamber between the seal land and the labyrinth seal is directed radially outward by the knife seal and through the plurality of openings into the lubrication fluid being allowed through the outer wall.

In some embodiments, the inner wall may include a deflector hoop and a deflector wall. The deflector hoop may extend axially away from the seal land and circumferentially around the knife seal. The deflector wall may extend radially inward from the deflector hoop toward the shaft to block the lubrication fluid and the buffer air from flowing between the deflector wall and the shaft.

These and other features of the present disclosure will become more apparent from the following description of the illustrative embodiments.

DETAILED DESCRIPTION OF THE DRAWINGS

Figure 1:
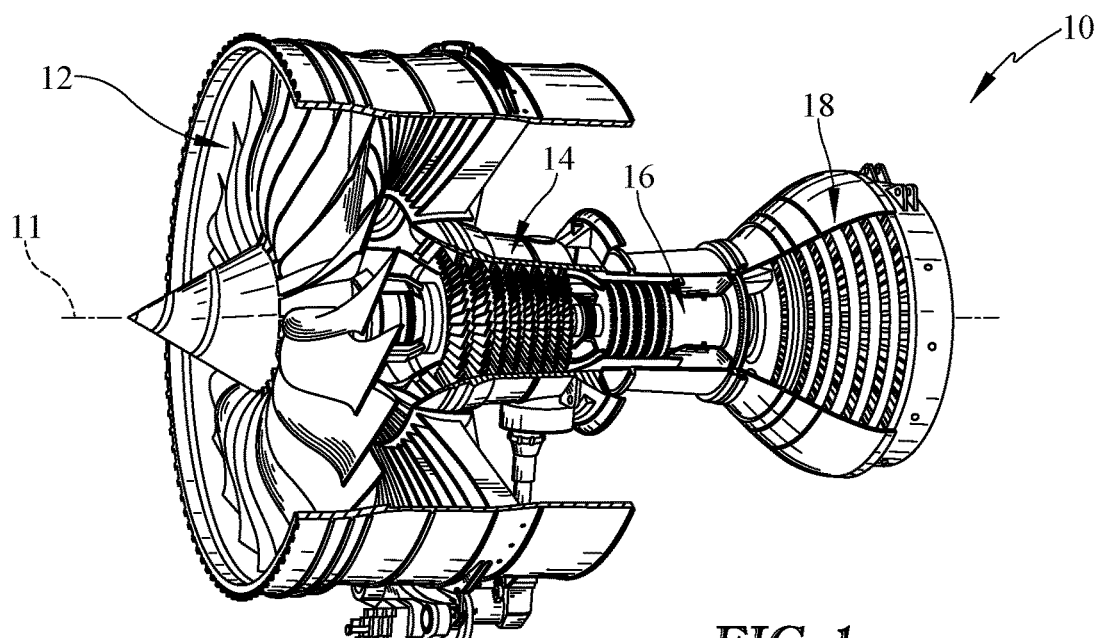
FIG. 1 is a cut-away perspective view of a gas turbine engine showing that the exemplary engine includes a fan, a compressor, a combustor, and a turbine and suggesting that the turbine includes a shaft assembly coupled to the turbine for driving rotation of the other components of the engine.

For the purposes of promoting an understanding of the principles of the disclosure, reference will now be made to a number of illustrative embodiments illustrated in the drawings and specific language will be used to describe the same.

Figure 2:
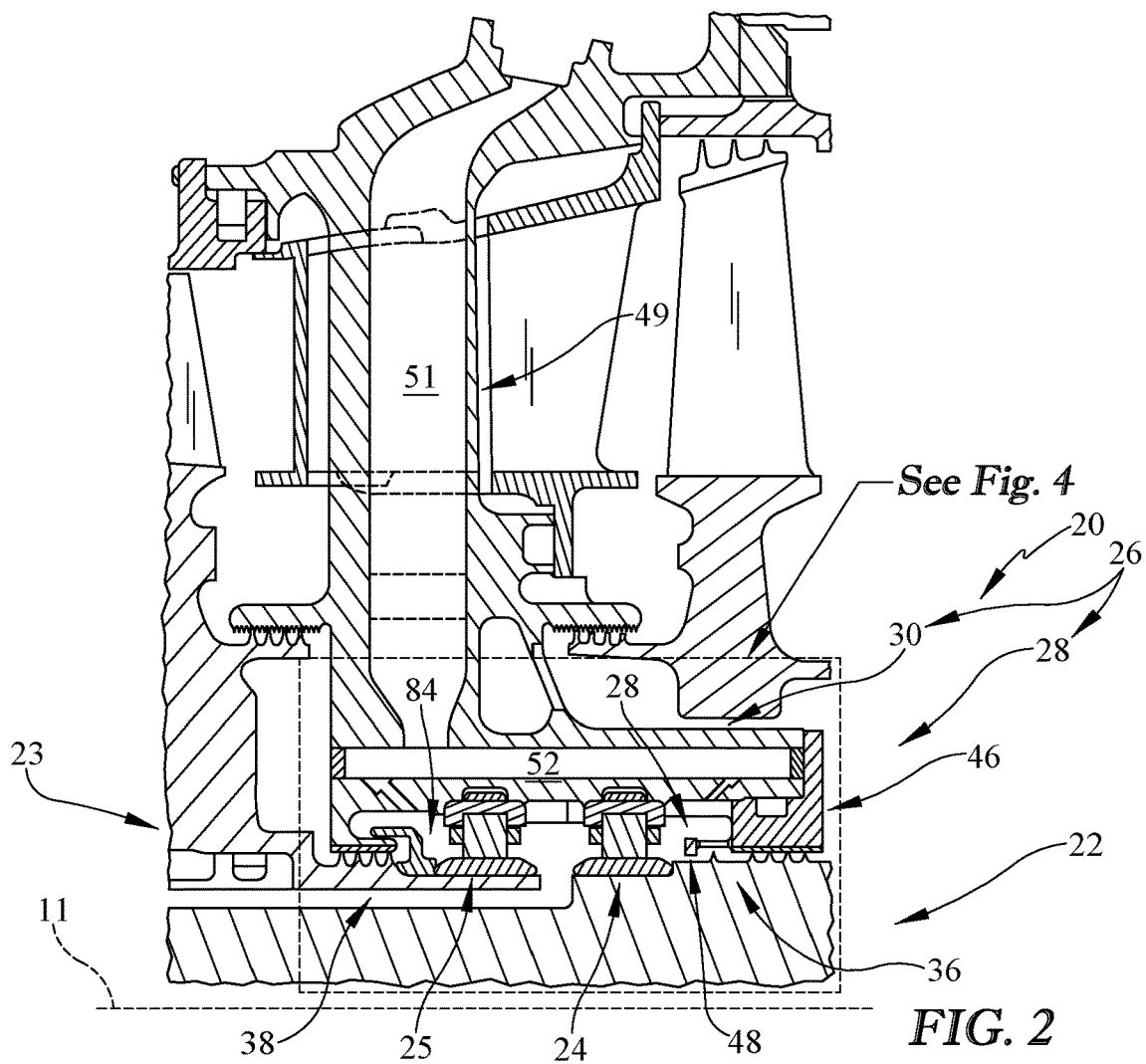
FIG. 2 is a section view of the shaft assembly included in the turbine of the gas turbine engine of FIG. 1 showing the shaft assembly includes a shaft arranged along an axis of the gas turbine engine and configured to rotate about the axis, at least one bearing coupled to the shaft to facilitate rotation of the shaft about the axis, and a sump assembly including an annular sump cover configured to conduct a lubrication fluid and a buffer air into an air chamber formed between the shaft, the bearing, and the annular sump cover.

An illustrative shaft assembly 20 for a gas turbine engine 10 is shown in FIGS. 1 and 2. The shaft assembly 20 includes a shaft 22, a bearing 24, and a sump 26 with an annular sump cover 28 as shown in FIGS. 2-5. The shaft 22 is arranged along an axis 11 of the gas turbine engine 10 and is configured to rotate about the axis 11. The bearing 24 is coupled to the shaft 22 to facilitate rotation of the shaft 22 about the axis 11. The annular sump cover 28 is fixed relative to the axis 11 and arranged around the shaft 22 and the bearing 24 to form an end wall of the sump 26 configured to collect and conduct lubrication fluid 27, such as oil, around the bearing 24.

Figure 4:
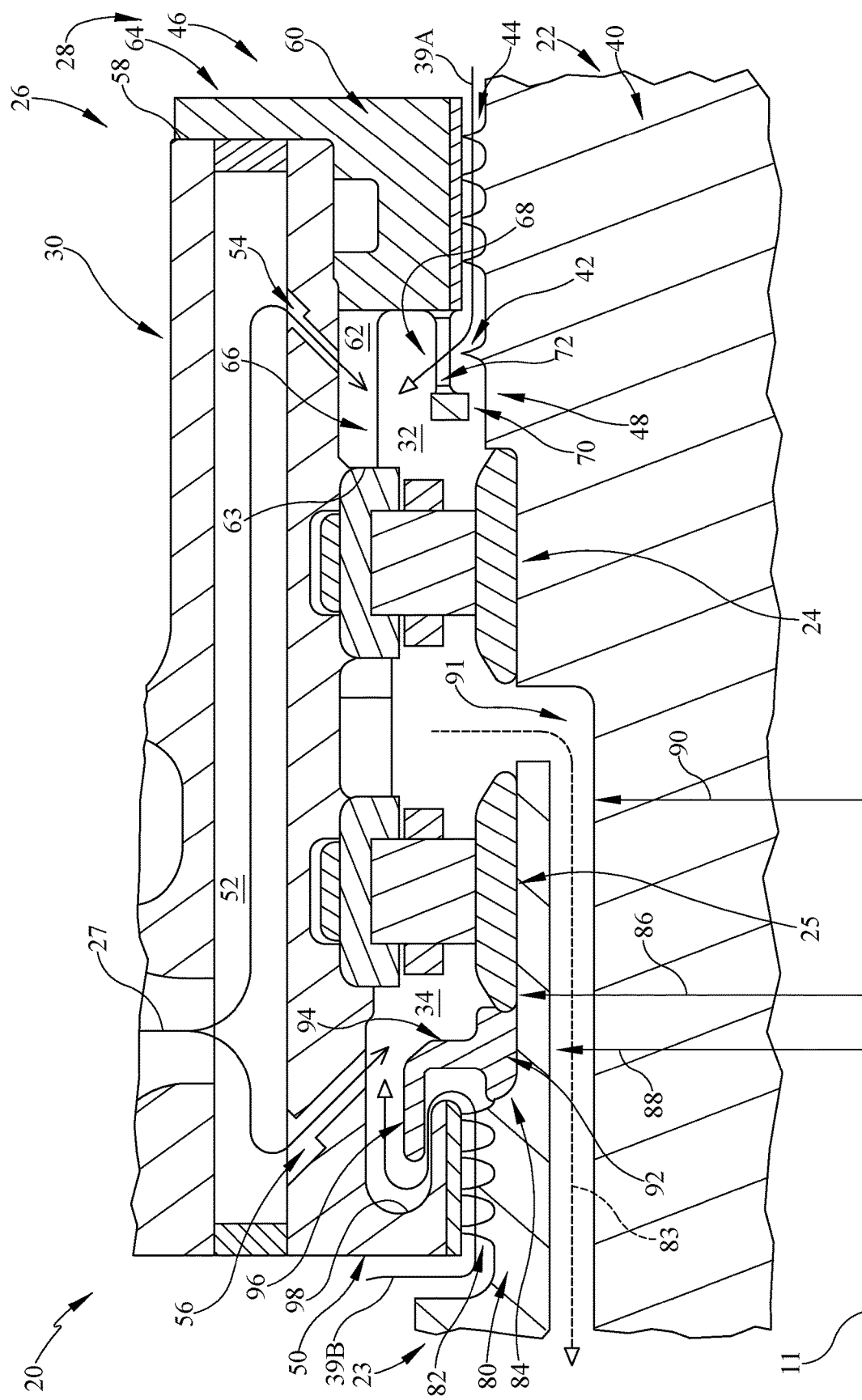
FIG. 4 is a detail view of FIG. 2 showing the annular sump cover further includes a hub shaped to define an lubrication fluid supply passageway that conducts the flow of lubrication fluid to a first air chamber axially aft of a first bearing included in the shaft assembly and a second air chamber located axially forward of a second bearing included in the shaft assembly.

The annular sump cover 28 is configured to conduct a lubrication fluid 27 and a buffer air 39A into an air chamber 32 formed between the shaft 22, the bearing 24, and the annular sump cover 28 as shown in FIG. 4. The flow of lubrication fluid 27 is supplied to the bearing 24. The flow of buffer air 39A is directed into the air chamber 32 and resists the flow of the lubrication fluid 27 from leaking out of the air chamber 32 of the sump 26.

The annular sump cover 28 includes a base portion 46 and an inner wall 48 as shown in FIGS. 2-5. The base portion 46 is arranged circumferentially around the shaft 22 to limit the flow of buffer air 39A from passing between the sump cover 28 and the shaft 22. The base portion 46 allows the flow of lubrication fluid 27 to proceed unimpeded radially through the annular sump cover 28. The inner wall 48 extends axially away from the base portion 46 toward the bearing 24 and is shaped to define a plurality of openings 72. The openings 72 are aligned axially with a flange 42 formed on the shaft 22 so that the flow of buffer air 39A entering the air chamber 32 is directed radially outward by the flange 42.

In the illustrative embodiment, a temperature of the buffer air 39A supplied to the air chamber 32 may sometimes exceed the allowable temperature of the components (i.e. the bearing 24) included in the assembly 20. To transfer heat from the buffer air 39A, the flange 42 on the shaft 22 directs the buffer air 39A radially outward through the openings 72 in the inner wall 48 into contact with the flow of the lubrication fluid 27. Heat is thereby transferred to the lubrication fluid 27 before the buffer air 39A impinges on the bearing 24, which reduces the temperature of the air 39A and prevents overly hot buffer air 39A from heating the bearing 24.

Figure 3:
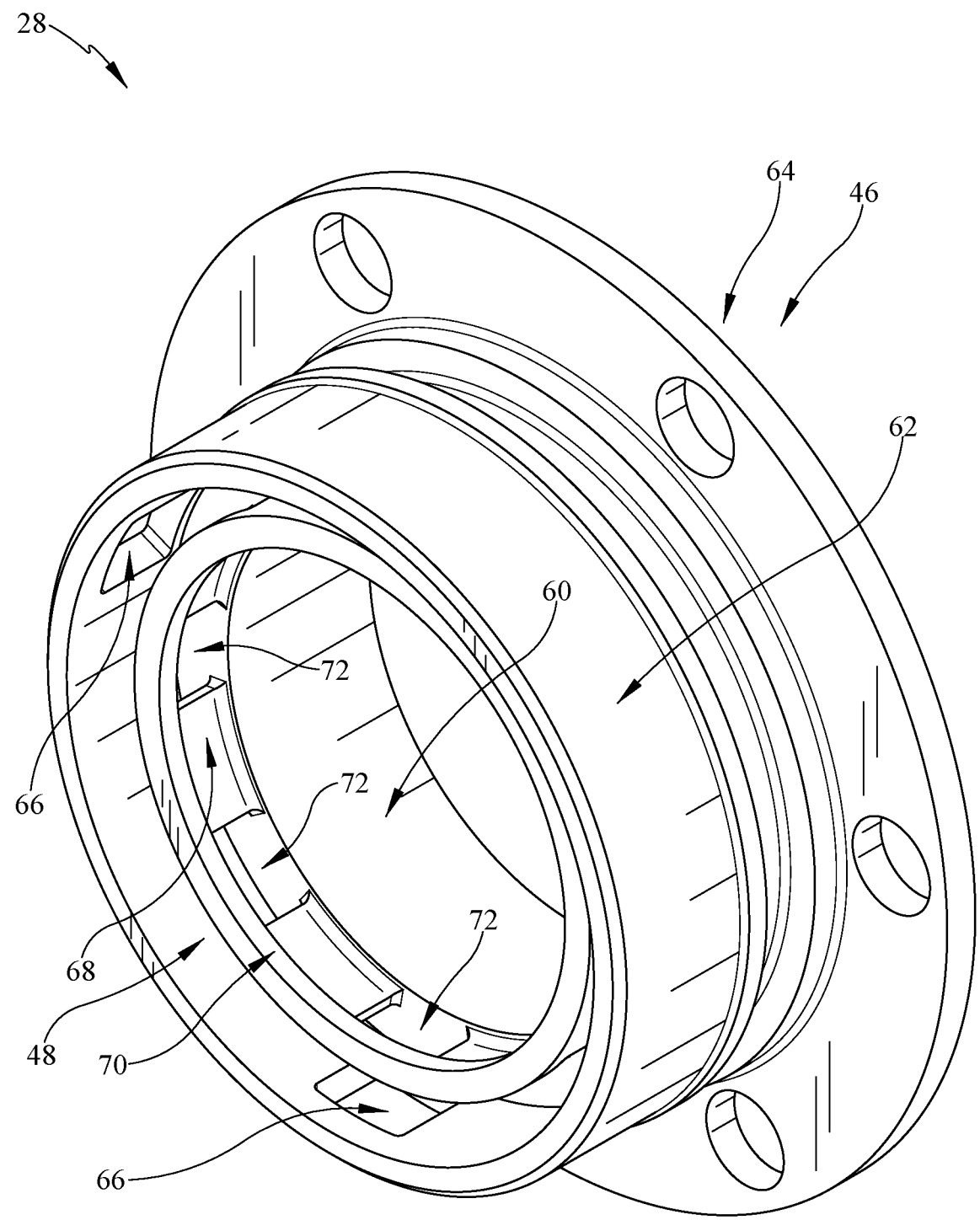
FIG. 3 is a perspective view of the annular sump cover included in the shaft assembly of FIG. 2 showing the sump cover includes a seal land that engages a portion of the shaft to limit a flow of the buffer air passing between the seal land and the shaft into the air chamber, an outer wall shaped to define passageways for conducting the lubrication fluid therethrough into the air chamber, and an inner wall shaped to define a plurality of openings to allow buffer air entering the air chamber to be directed radially outward into contact with the lubrication fluid.
Figure 5:
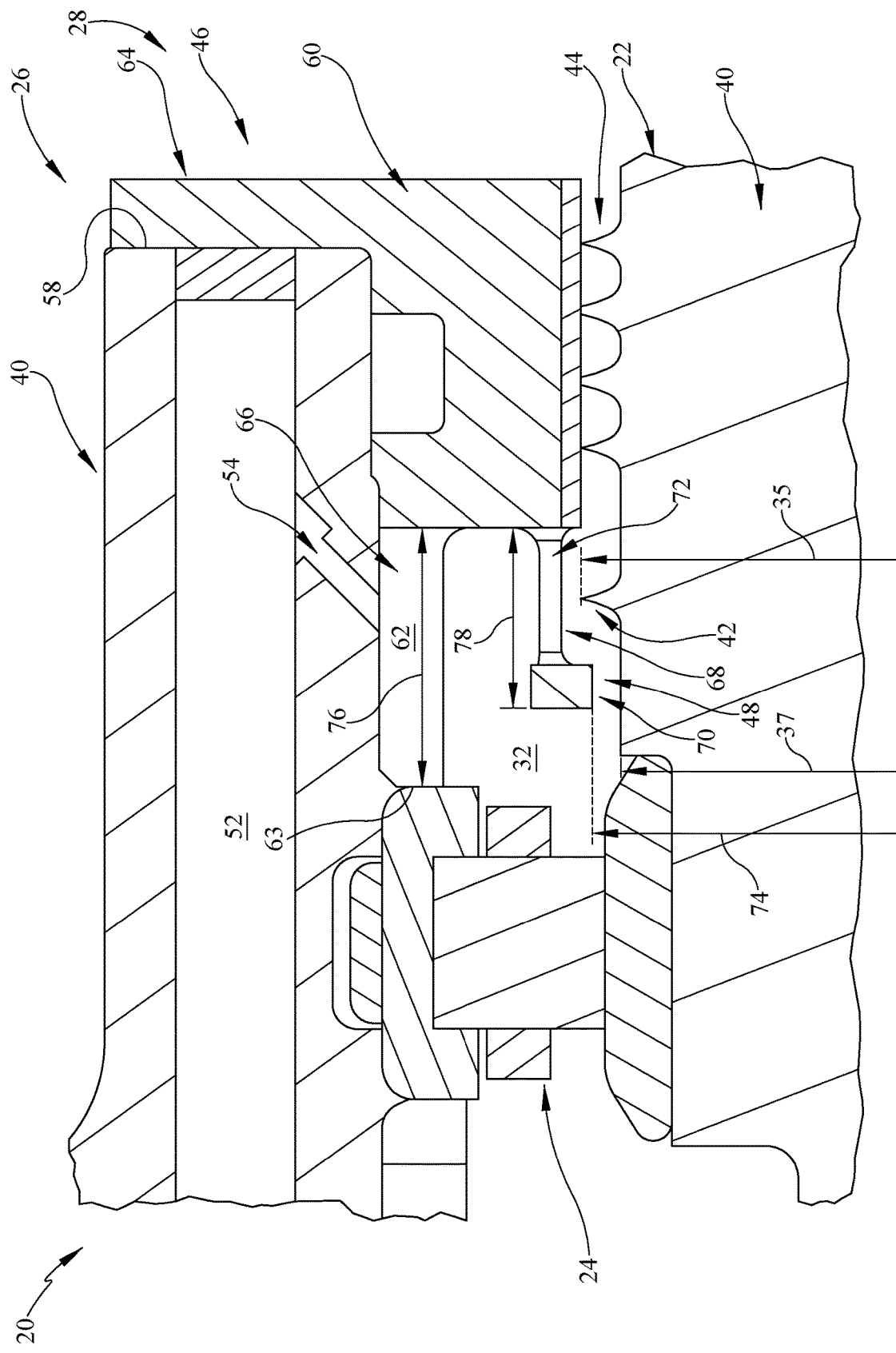
FIG. 5 is a detail view of FIG. 4 showing the inner wall of the annular sump cover includes a deflector hoop that extends axially away from the seal land and circumferentially around a flange of the shaft and a deflector wall that extends radially inward from the deflector hoop toward the shaft to block the lubrication fluid and the buffer air from flowing between the deflector wall and the shaft.

The inner wall 48 includes a deflector hoop 68 and a deflector wall 70 as shown in FIGS. 3-5. The deflector hoop 68 extends axially away from the base portion 46 and circumferentially around the flange 42 of the shaft 22. The deflector wall 70 extends radially inward from the deflector hoop 68 toward the shaft 22. The deflector wall 70 blocks the lubrication fluid 27 and the buffer air 39A from flowing between the deflector wall 70 and the shaft 22.

In the illustrative embodiment, the flange 42 has an outer radial diameter 35 and the deflector wall 70 has an inner radial diameter 74 as shown in FIG. 5. The outer radial diameter 35 is greater than the inner radial diameter 74 to block the buffer air from flowing over the flange 42 and between the deflector wall 70 and the shaft 22. In the illustrative embodiment, the deflector wall 70 is spaced apart radially from the shaft 22 such that the inner radial diameter 74 of the deflector wall 70 is greater than a first outer diameter 37 of the shaft 22.

The deflector hoop 68 is shaped to include the plurality of openings 72 as shown in FIGS. 3-5. The openings 72 are spaced circumferentially apart about the axis 11. The number of openings 72 in the deflector hoop 68 may vary.

Turning again to the gas turbine engine 10, the illustrative aerospace gas turbine engine 10 includes a fan 12, a compressor 14, a combustor 16, a turbine 18, and the shaft assembly 20 as shown in FIGS. 1 and 2. The fan 12 is driven by the turbine 18 and provides thrust. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

The shaft assembly 20 of the gas turbine engine 10 comprises an aft side 36 and a forward side 38 of the sump 26. The aft side 36 of the sump 26 includes the low-pressure shaft 22, the low-pressure bearing 24, and the annular sump cover 28, which closes off the sump 26 aft of the low-pressure bearing 24 in the illustrative embodiment. The forward side 38 of the sump 26 includes a high-pressure shaft 23, a high-pressure bearing 25 coupled to the shaft 23 to facilitate rotation of the shaft 23 about the axis 11, and a hub 30 included in the sump 26, which closes off the sump 26 forward of the high-pressure bearing 25 in the illustrative embodiment.

In the illustrative embodiment, the shafts 22, 23 are co-axial and the low-pressure shaft 22 extends axially through the high-pressure shaft 23 in the illustrative embodiment. The low-pressure side bearing 24 is spaced axially aft of the high-pressure side bearing 25.

The sump 26 is configured to conduct the lubrication fluid 27 and the buffer air 39A, 39B into the low-pressure air chamber 32 formed between the low-pressure shaft 22, the low-pressure side bearing 24, and the annular sump cover 28 as well as a high-pressure air chamber 34 formed between the high-pressure shaft 23, the high-pressure side bearing 25, and the portion 50 of the sump 26. On the aft side 36 of the sump 26, the flange 42 and the inner wall 48 of the annular sump cover 28 cooperate to direct a first flow of buffer air 39A into contact with the lubrication fluid 27 in the low-pressure chamber 32 and to block the lubrication fluid 27 and the buffer air 39A from flowing between the annular sump cover 28 and the shaft 22. On the forward side 38, the hub 30 and a slinger 84 included in the shaft 23 cooperate to direct a second flow of buffer air 39B into contact with the lubrication fluid 27 in the high-pressure chamber 34 and to block the lubrication fluid 27 from flowing between the hub 30 and the shaft 23.

In the illustrative embodiment, the low-pressure shaft 22 is coupled to a low-pressure turbine included in the turbine section 18 to drive rotation of the compressor 14. The high-pressure shaft 23 is coupled to a high-pressure turbine included in the turbine section 18 to drive rotation of the fan 12.

The low-pressure shaft 22, or the first shaft 22, includes a shaft body 40, the flange 42, and a seal 44 as shown in FIGS. 4 and 5. The shaft body 40 extends along the axis 11. The flange 42, or sometimes referred to as a knife seal 42, extends radially away from the shaft body 40. The seal 44 extends radially away from the shaft body 40. The seal 44 is spaced apart axially from the knife seal 42 in the illustrative embodiment so that the deflector hoop 68 of the inner wall 48 is axially aligned with the knife seal 42.

In the illustrative embodiment, the seal 44 is a labyrinth seal 44. In some embodiments, the shaft 22 may include another suitable seal 44 to limit the flow of the buffer air 39A into the air chamber 32. In other embodiments, the shaft 22 may not include such a seal 44.

The first bearing 24 is coupled to the first shaft 22 to facilitate rotation of the first shaft 22 about the axis 11. The first bearing 24 is spaced apart axially from the labyrinth seal 44 to locate the knife seal 42 axially between the first bearing 24 and the labyrinth seal 44.

The sump 26 includes the annular sump cover 28 and the hub 30 as shown in FIGS. 2-5. The annular sump cover 28 is a separate component in the illustrative embodiment that is coupled to the hub 30. The hub 30 is fixed relative to the axis 11 and is shaped to define a lubrication fluid supply passageway 52 that conducts the flow of lubrication fluid 27 to the air chambers 32, 34. In other embodiments, the annular sump cover 28 and the hub 30 of the sump 26 may be a single integral component.

In the illustrative embodiment, the hub 30 is further shaped to define a first lubrication fluid jet 54 and a second lubrication fluid jet 56 as shown in FIGS. 4 and 5. The lubrication fluid jets 54, 56 are in fluid communication with the supply passageway 52 to direct the lubrication fluid 27 into the respective air chambers 32, 34.

The first lubrication fluid jet 54 directs fluid 27 through the annular sump cover 28 into the first air chamber 32 at the first bearing 24. The second lubrication fluid jet 56 conducts fluid 27 into the second air chamber 34 at the second bearing 25.

In the illustrative embodiment, the hub 30 connects to a strut 49 as shown in FIG. 2. The strut 49 that extends radially outward through a static vane in the turbine 18. The strut 49 includes an inlet passageway 51 that conducts the flow of lubrication fluid 27 to the lubrication fluid supply passageway 52.

The base portion 46 of the annular cover 28 includes a seal land 60, an outer wall 62, and a cover flange 64 as shown in FIGS. 3-5. The seal land 60 is aligned axially with the labyrinth seal 44 to limit the flow of the buffer air 39A passing between the seal land 60 and the labyrinth seal 44 into the air chamber 32. The outer wall 62 extends axially away from the seal land 60 toward the bearing 24. The inner wall 48 extends axially away from the seal land 60 toward the bearing 24 at a location radially inward of the outer wall 62. The cover flange 64 extends radially outward from the seal land 60 and engages an axial facing surface 58 of the hub 30 to axially locate the inner wall 48 relative to the knife seal 42.

The outer wall 62 is formed to define at least one passage 66 therethrough as shown in FIGS. 3-5. The passage 66 extends radially through the outer wall 62 and allows the lubrication fluid 27 to proceed unimpeded radially through the annular sump cover 28 and toward the bearing 24.

The first lubrication fluid jet 54 is aligned with the passage 66 formed in the outer wall 62 in the illustrative embodiment. The first lubrication fluid jet 54 directs the flow of the lubrication fluid 27 through the passage 66 into the air chamber 32 at the bearing 24.

In the illustrative embodiment, the outer wall 62 is formed to define a plurality of passages 66 as shown in FIG. 3. The passages 66 are spaced apart circumferentially about the axis 11. The number of passages 66 in the outer wall 62 may vary.

The outer wall 62 extends axially away from the seal land 60 a first distance 76, while the inner wall 48 extends axially away from the seal land 60 a second distance 78 as shown in FIG. 5. The first distance 76 is greater than the second distance 78.

In the illustrative embodiment, the outer wall 62 extends axially away from the seal land 60 to a terminal axial end 63 as shown in FIGS. 4 and 5. The axial end 63 is spaced apart axially from the first bearing 24. The end 63 of the outer wall 62 is spaced apart axially to define a small gap (not shown) axially between the outer wall 62 and the first bearing 24. In other embodiments, the outer wall 62 abuts the first bearing 24.

The second shaft 23 includes a second shaft body 80, a second seal 82, and the slinger 84 as shown in FIG. 4. The shaft body 80 extends along the axis 11. The second seal 82, or labyrinth seal 82, extends radially away from the shaft body 80. The slinger 84 is coupled to the shaft body 80 for rotation therewith. In the illustrative embodiment, the second bearing 25 coupled to the second shaft 23 is spaced apart axially from the second labyrinth seal 82 to locate the slinger 84 axially between the second labyrinth seal 82 and the second bearing 25.

In the illustrative embodiment, the hub 30 is further shaped to include a second seal land 50 that cooperates with the second seal 82 of the second shaft 23 as shown in FIG. 4. The second seal land 50 of the hub 30 extends radially inward and engages the second labyrinth seal 82.

The second shaft 23 has a second shaft outer diameter 86 and a second shaft inner diameter 88 as shown in FIG. 4. The second shaft inner diameter 88 of the second shaft 23 is greater than a second outer diameter 90 of the first shaft 22 so as to form a scavenge passageway 91 therebetween. The second outer diameter 90 of the first shaft 22 is less than the first outer diameter 37 of the first shaft 22. In the illustrative embodiment, the scavenge passageway 91 has an inlet located axially between the first bearing 24 and the second bearing 25.

The slinger 84 includes a base portion 92, a radial portion 94, and an axially-extending portion 96 as shown in FIG. 4. The base portion 92 is coupled to the second shaft 23. The radial portion 94 extends radially outward from the base portion 92 of the slinger 84. The axially-extending portion 96 extends axially forward from the radial portion 94 toward the second seal land 50.

In the illustrative embodiment, the axially-extending portion 96 of the slinger 92 extends over a portion of the second seal land 50 to cause the second flow of buffer air 39B to follow a winding path between the slinger 84 and the second seal land 50. This forces the flow of buffer air 39B to flow axially forward away from the second bearing 25, in which a curved surface 98 of the seal land 50 then directs the flow of buffer air 39B into contact with the flow of lubrication fluid 27 entering into the second air chamber 34.

The lubrication fluid and buffer air mixture 83 is then exhausted out the scavenge passageway 91 as shown in FIG. 4. The lubrication fluid and buffer air mixture 83 flows across the bearings 24, 25 toward the inlet of the scavenge passageway 91 during use of the gas turbine engine 10.

A method for cooling the buffer air flows 39A, 39B before it contacts the bearings 24, 25 may comprise several steps. The method begins by conducting the flow of the lubrication fluid 27 into the each of the air chambers 32, 34 toward the corresponding bearings 24, 25.

Simultaneously, the method includes conducting the different buffer air flows 39A, 39B between the shafts 22, 23 and the annular sump cover 28 and the hub 30. The first flow of buffer air 39A is conducted into the first air chamber 32 between the first shaft 22 and the first labyrinth seal 44. The second flow of buffer air 39B is conducted into the second air chamber 34 between the second shaft 23 and the second labyrinth seal 82.

As the first flow of buffer air 39A is conducted into the air chamber 32, the flange 42 directs the flow of buffer air 39A radially outward into contact with the flow of lubrication fluid 27 as shown in FIG. 4. The first flow of buffer air 39A is directed toward the flow of lubrication fluid 27 as it enters the air chamber 32. The buffer air 39A and the lubrication fluid 27 are thereby mixed together to transfer heat from the buffer air 39A to the lubrication fluid 27 before the buffer air 39A impinges on the first bearing 24.

On the high-pressure side, as the second flow of buffer air 39B is conducted into the air chamber 34, the slinger 84 directs the flow of buffer air 39B axially forward toward the seal land 50. The curved surface 98 of the seal land 50 then turns the flow axially aft toward the flow of lubrication fluid 27 as it enters the air chamber 34. The buffer air 39B and the lubrication fluid 27 are thereby mixed together to transfer heat from the buffer air 39B to the lubrication fluid 27 before the buffer air 39B impinges on the bearing 25.

The lubrication fluid and buffer air mixture 83 lubricates and cools the bearings 24, 25 before it is exhausted out the scavenge passageway 91. The mixture 83 for both bearings 24, 25 flows through the scavenge passageway 91.

To prevent the components from overheating, the sump 26 includes features, the inner wall 48 on the annular sump cover 28 and the slinger 84 on the shaft 23, to help cool the buffer air flows 39A, 39B before it contacts the bearings 24, 25. The buffer air flows 39A, 39B eventually passes through the bearings 24, 25 to exit the assembly 20 through the scavenge passageway 91.

In the illustrative embodiment, buffer air 39A enters the low-pressure air chamber 32 from between the first labyrinth seal 44 of the first shaft 22 and the seal land 60. A singular knife seal 42, or the flange 42 is surrounded by the inner wall 48 to direct the buffer air 39A radially outward.

As the buffer air 39A enters the chamber 32, the buffer air 39A will tend to flow radially outward through openings 72 in the inner wall 48 because of the single knife seal 42 and the inner wall 48 act as barriers to continued axial flow. Instead, the buffer air 39A will take the path of least resistance.

The inner radial diameter 74 of the deflector wall 70 is slightly smaller than the outer diameter 35 of the single knife seal 42. Hence, the hot air will not directly impinge on the low-pressure roller bearing 24. The oil jet 54 is located on the aft side of the low-pressure roller bearing 24.

On the high-pressure side, air enters the forward lab seal 82 and is redirected by the forward slinger 84. The forward slinger 84 prevents the air from directly impinging on the high-pressure bearing 25. The oil jet 56 that supplies lubrication to the high-pressure bearing 25 is located on the forward side of the bearing 25. The lubrication fluid 27 will tend to splash off the bearings 24, 25 and mix with the hot air. This mixing will cool the air.

In other embodiments, lubrication oil may be delivered by a separable oil jet. However, in the illustrative embodiment, the hub 30 has a passageway 52 with an integral jets 54, 56. The turbine support includes the hub 30 and a strut 49. In the illustrative embodiment, the turbine support include a plurality of struts 49 spaced apart circumferential around the axis 11 and attached to the hub 30 and the outer casing. The turbine support employed a "wet strut" concept with lubrication fluid flow through a cast passage 51 in the strut 49. The cast passage 51 is in fluid communication with the passageway 52 and integral jets 54, 56.

The inner wall 48 and the flange 42 direct the buffer air 39A radially outward. The rotation of the shaft 22 and the bearing 24 also causes the lubrication fluid 27 to splash off the bearing 24 and creates a wall of fluid at the deflector wall 70. The buffer air 39A is directed at this wall of the lubrication fluid 27 thereby cooling the air 39A before it contacts the bearing 24.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A shaft assembly for a gas turbine engine, the shaft assembly comprising
   a shaft arranged along an axis and configured to rotate about the axis, the shaft having a shaft body that extends along the axis, a knife seal that extends radially away from the shaft body, and a labyrinth seal spaced apart axially from the knife seal and extending radially away from the shaft body,
   a bearing coupled to the shaft to facilitate rotation of the shaft about the axis, the bearing spaced apart axially from the labyrinth seal to locate the knife seal axially between the bearing and the labyrinth seal, and
   an annular sump cover fixed relative to the axis and configured to allow a lubrication fluid and a buffer air into an air chamber formed between the shaft, the bearing, and the annular sump cover, the annular sump cover including a seal land aligned axially with the labyrinth seal to limit a flow of the buffer air passing between the seal land and the labyrinth seal into the air chamber, an outer wall that extends axially away from the seal land toward the bearing and formed to define a passage therethrough for allowing the lubrication fluid to proceed unimpeded radially through the annular sump cover and toward the bearing, and an inner wall that extends axially away from the seal land toward the bearing,
   wherein the inner wall is formed to define a plurality of openings that are aligned axially with and located directly radially outward of the knife seal so that the buffer air entering the air chamber between the seal land and the labyrinth seal is directed radially outward by the knife seal and through the plurality of openings into the lubrication fluid being allowed through the outer wall to transfer heat from the buffer air to the lubrication fluid before the buffer air impinges on the bearing.

2. The shaft assembly of claim 1, wherein the inner wall includes a deflector hoop that extends axially away from the seal land and circumferentially around the knife seal and a deflector wall that extends radially inward from the deflector hoop toward the shaft to block the lubrication fluid and the buffer air from flowing between the deflector wall and the shaft.

3. The shaft assembly of claim 2, wherein the knife seal has an outer radial diameter, the deflector wall has an inner radial diameter, and the outer radial diameter is greater than the inner radial diameter to block the buffer air from flowing over the knife seal and between the deflector wall and the shaft.

4. The shaft assembly of claim 2, wherein the deflector wall is spaced apart radially from the shaft.

5. The shaft assembly of claim 1, wherein an axial end of the outer wall is spaced apart axially from the bearing to define a gap therebetween.

6. The shaft assembly of claim 1, wherein the outer wall extends axially away from the seal land a first distance, the inner wall extends axially away from the seal land a second distance, and the first distance is greater than the second distance.

7. The shaft assembly of claim 1, further comprising a hub fixed relative to the axis and shaped to define a lubrication fluid supply passageway that conducts the lubrication fluid through the outer wall and into the air chamber.

8. The shaft assembly of claim 7, wherein the annular sump cover further includes a cover flange that extends radially outward from the seal land and engages an axial facing surface of the hub to axially locate the inner wall relative to the knife seal.

9. The shaft assembly of claim 7, wherein the inner wall includes a deflector hoop that extends axially away from the seal land and circumferentially around the knife seal and a deflector wall that extends radially inward from the deflector hoop toward the shaft to block the lubrication fluid and the buffer air from flowing between the deflector wall and the shaft.

10. A shaft assembly for a gas turbine engine, the shaft assembly comprising
a shaft arranged along an axis and configured to rotate about the axis, the shaft having a shaft body that extends along the axis and a flange that extends radially away from the shaft body,
a bearing coupled to the shaft to facilitate rotation of the shaft about the axis, and
an annular sump cover configured to allow a lubrication fluid and a buffer air into an air chamber formed between the shaft, the bearing, and the annular sump cover, the annular sump cover including a base portion formed to define a passage therethrough for allowing the lubrication fluid to proceed unimpeded radially through the annular sump cover and toward the bearing and an inner wall that extends axially away from the base portion toward the bearing,
wherein the inner wall is formed to define a plurality of openings that are aligned axially with and located radially outward of the flange so that the buffer air entering the air chamber between the base portion and the shaft is directed radially outward by the flange and through the plurality of openings into the lubrication fluid being allowed through the base portion.

11. The shaft assembly of claim 10, wherein the inner wall includes a deflector hoop that extends axially away from the base portion and circumferentially around the flange and a deflector wall that extends radially inward from the deflector hoop toward the shaft to block the lubrication fluid and the buffer air from flowing between the deflector wall and the shaft.

12. The shaft assembly of claim 11, wherein the flange has an outer radial diameter, the deflector wall has an inner radial diameter, and the outer radial diameter is greater than the inner radial diameter to block the buffer air from flowing over the flange and between the deflector wall and the shaft.

13. The shaft assembly of claim 11, wherein the deflector wall is spaced apart radially from the shaft.

14. The shaft assembly of claim 10, wherein the shaft further includes a seal spaced apart axially from the flange and extending radially away from the shaft body, and wherein the base portion of the annular sump cover includes a seal land aligned axially with the seal to limit a flow of the buffer air passing between the seal land and the seal into the air chamber and an outer wall that extends axially away from the seal land toward the bearing and formed to define the passage therethrough for allowing the lubrication fluid to proceed unimpeded radially through the annular sump cover and toward the bearing.

15. The shaft assembly of claim 14, wherein an axial end of the outer wall is spaced apart axially from the bearing to define a gap therebetween.

16. The shaft assembly of claim 14, wherein the outer wall extends axially away from the seal land a first distance, the inner wall extends axially away from the seal land a second distance, and the first distance is greater than the second distance.

17. The shaft assembly of claim 14, further comprising a hub fixed relative to the axis and shaped to define a lubrication fluid supply passageway that allows the lubrication fluid through the outer wall and into the air chamber, wherein the annular sump cover further includes a cover flange that extends radially outward from the seal land and engages an axial facing surface of the hub to axially locate the inner wall relative to the flange.

18. A method comprising
providing a shaft assembly for a gas turbine engine, the shaft assembly comprising a shaft arranged along an axis and configured to rotate about the axis, a bearing coupled to the shaft to facilitate rotation of the shaft about the axis, and an annular sump cover configured to allow a lubrication fluid and a buffer air into an air chamber formed between the shaft, the bearing, and the annular sump cover, wherein the shaft includes a knife seal that extends radially outward and the annular sump cover is formed to define a plurality of openings that are aligned axially with and located radially outward of the knife seal,
conducting a flow of the lubrication fluid into the air chamber toward the bearing,
conducting a flow of the buffer air between the shaft and the annular sump cover,
directing the flow of buffer air radially outward away from the knife seal and through the plurality of openings formed in the annular sump cover into contact with the flow of lubrication fluid as the flow of lubrication fluid enters the air chamber, and
mixing the flow of buffer air with flow of lubrication fluid to transfer heat from the buffer air to the lubrication fluid before the buffer air impinges on the bearing.

19. The method of claim 18, wherein the shaft includes a shaft body that extends along the axis, the knife seal that extends radially away from the shaft body, and a labyrinth seal spaced apart axially from the knife seal and extending radially away from the shaft body,
wherein the annular sump cover includes a seal land aligned axially with the labyrinth seal to limit the flow of the buffer air passing between the seal land and the labyrinth seal into the air chamber, an outer wall that extends axially away from the seal land toward the bearing and formed to define a passage therethrough for allowing the flow of lubrication fluid to proceed unimpeded radially through the annular sump cover, and an inner wall that extends axially away from the seal land toward the bearing, and wherein the inner wall is formed to define the plurality of openings that are aligned axially with and located radially outward of the knife seal so that the buffer air entering the air chamber between the seal land and the labyrinth seal is directed radially outward by the knife seal and through the plurality of openings into the lubrication fluid being allowed through the outer wall.

20. The method of claim 19, wherein the inner wall includes a deflector hoop that extends axially away from the seal land and circumferentially around the knife seal and a deflector wall that extends radially inward from the deflector hoop toward the shaft to block the lubrication fluid and the buffer air from flowing between the deflector wall and the shaft.

\* \* \* \* \*